(12) United States Patent
Olson et al.

(10) Patent No.: US 11,401,216 B2
(45) Date of Patent: Aug. 2, 2022

(54) CALCIUM CARBONATE COMPOSITION FOR USE IN CONCRETE

(71) Applicant: CARMEUSE NORTH AMERICA, Pittsburgh, PA (US)

(72) Inventors: Lance Olson, Cranberry Township, PA (US); Dale C Andrews, Bethel Park, PA (US)

(73) Assignee: CARMEUSE LIME, INC., Pittsburgh, PA (US)

( * ) Notice: Subject to any disclaimer, the term of this patent is extended or adjusted under 35 U.S.C. 154(b) by 95 days.

(21) Appl. No.: 16/632,603

(22) PCT Filed: Jul. 25, 2018

(86) PCT No.: PCT/US2018/043683
§ 371 (c)(1),
(2) Date: Jan. 21, 2020

(87) PCT Pub. No.: WO2019/023339
PCT Pub. Date: Jan. 31, 2019

(65) Prior Publication Data
US 2020/0239373 A1  Jul. 30, 2020

Related U.S. Application Data

(60) Provisional application No. 62/536,668, filed on Jul. 25, 2017.

(51) Int. Cl.
| | |
|---|---|
| C04B 40/00 | (2006.01) |
| C04B 14/26 | (2006.01) |
| C04B 14/28 | (2006.01) |
| C04B 28/04 | (2006.01) |

(52) U.S. Cl.
CPC .......... *C04B 40/0042* (2013.01); *C04B 14/26* (2013.01); *C04B 14/28* (2013.01); *C04B 28/04* (2013.01)

(58) Field of Classification Search
CPC ......... C04B 14/26; C04B 14/28; C04B 28/04; C04B 40/0042; C04B 12/04; C04B 14/06; C04B 16/08; C04B 20/10; C04B 20/12; C04B 22/064; C04B 28/02; C04B 28/26; C04B 2103/0088; C04B 2103/32
See application file for complete search history.

(56) References Cited

U.S. PATENT DOCUMENTS

| | | | |
|---|---|---|---|
| 5,965,201 A | 10/1999 | Jones, Jr. | |
| 7,128,965 B2 * | 10/2006 | Famy | ...................... B28B 1/527 428/297.4 |
| 2011/0067600 A1 | 3/2011 | Constantz et al. | |
| 2011/0088598 A1 | 4/2011 | Lisowski et al. | |
| 2014/0047999 A1 | 2/2014 | Razi | |
| 2016/0318798 A1 * | 11/2016 | Minkara | ................. C04B 14/28 |

FOREIGN PATENT DOCUMENTS

| | | | |
|---|---|---|---|
| CN | 106747090 A | * | 5/2017 |
| CN | 106810931 A | * | 6/2017 |
| GN | 1217301 A | | 5/1999 |
| KR | 10-2004-0052584 A | * | 6/2004 |

* cited by examiner

*Primary Examiner* — Anthony J Green
(74) *Attorney, Agent, or Firm* — Dentons Cohen & Grigsby P.C.

(57) ABSTRACT

A composition for use in concrete may generally comprise, based on total dry weight percent of the composition: at least 50% calcium carbonate and magnesium carbonate; 1-40% pozzolan; up to 3% calcium oxide; up to 2% plasticizer; up to 5% metal salt; and balance of incidental impurities. Methods of making and using the same are also described.

15 Claims, No Drawings

CALCIUM CARBONATE COMPOSITION FOR USE IN CONCRETE

CROSS-REFERENCE TO RELATED APPLICATION

This application is a 371 national entry of PCT Patent Application No. PCT/US2018/043683 filed Jul. 25, 2018 which claims priority to U.S. provisional application Ser. No. 62/536,668 filed on Jul. 25, 2017, both of which are hereby incorporated by reference in their entirety.

FIELD OF INVENTION

The present invention relates to compositions comprising ground calcium carbonate for use in concrete as well as methods of making and using the same.

BACKGROUND

The production of concrete may comprise the following components: Portland cement, water, coarse and fine aggregate, chemical admixtures and supplementary cementitious materials. Supplementary cementitious materials may be often used as property enhancers in concrete. Often, supplementary cementitious materials may be pozzolanic materials such as fly ash, slag cement, silica fume, and metakaolin because of their ability to impart strength to the final concrete. Supplementary cementitious material may also be used to alter cure times, permeability, workability, flow, cost, and other chemical and physical characteristics of the concrete. Furthermore, the ability to offset cement, an energy intensive product to produce, with supplementary cementitious materials may reduce the greenhouse gas "footprint" of the concrete.

One of the more common supplementary cementitious materials that has been used in concrete is fly ash. Its use and availability as supplementary cementitious material in concrete has grown significantly in the United States since the late 1930's as the production and availability of fly ash grew due to the growing number of coal fired power plants. However, regulations that were enacted by the Environmental Protection Agency on Oct. 4, 2016 relating to the disposal of coal combustion products (which include fly ash) and the uncertainty that exists with future regulation and costs associated with burning coal have resulted in a reduction in the supply of fly ash due to closures and reduced usage of the coal fired power plants.

Accordingly, more efficient and/or cost effective compositions and processes for use in concrete may be desirable.

SUMMARY

A composition for use in concrete may generally comprise, based on total dry weight percent of the composition: at least 50% calcium carbonate and magnesium carbonate; 1-40% pozzolan; up to 3% calcium oxide; up to 2% plasticizer; up to 5% metal salt; and balance of incidental impurities.

A cementitious mixture may generally comprise, based on total volume of the mixture: 0.5 to 10% of a composition for use in concrete; 2 to 30% cement; 50 to 85% aggregate; 10 to 25% water; and optionally 4 to 8% air; wherein the composition for use in concrete may generally comprise, based on total dry weight percent of the composition: at least 50% calcium carbonate and magnesium carbonate; 1-40% pozzolan; up to 3% calcium oxide; up to 2% plasticizer; up to 5% sodium silicate; and balance of incidental impurities.

DETAILED DESCRIPTION

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the articles "one", "a", "an", and "the" include "at least one" or "one or more" of what is claimed or described, unless indicated otherwise. For example, "a component" means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

As generally used herein, the term "characterized by" is meant to be non-limiting.

The present invention relates to compositions comprising improved ground calcium carbonate for use in concrete as well as methods of making and using the same. On its own, ground calcium carbonate (GCC) is not a pozzolan and may not be used successfully as a supplementary cementitious material in concrete. The composition as generally described herein may be used to replace up to 30% of cement in concrete, such as up to 20%, 0.5-30%, 0.5-10%, 0.6-6%, 2-4%, 4-10%, 8-12%, 10-30%, 15-25%, and 18-20%. The composition may be characterized by similar compressive strength, as tested by ASTM C39-18, when compared to a concrete mixture lacking any supplemental cement. The composition may be characterized by a reduced chloride permeability, as tested by ASTM C1202-17a, when compared to a concrete mixture lacking any supplemental cement.

The present invention may comprise a composition including ground calcium carbonate, pozzolanic materials, and non-pozzolanic materials. The composition may coat and/or become inter-dispersed within GCC to form a coated GCC and/or mixture. The composition may provide superior strength, reduced permeability, and other property enhancements to the GCC when used as a supplementary cementitious material in concrete.

A composition for use in concrete may generally comprise, based on total dry weight percent of the composition, at least 50% GCC including calcium carbonate and magnesium carbonate; 1-40% pozzolan; up to 3% calcium oxide; up to 2% plasticizer; up to 5% metal salt; and balance of incidental impurities. The composition for use in concrete may generally comprise, based on total dry weight percent of the composition, 60 to 99% calcium carbonate and magnesium carbonate; 1-20% pozzolan; up to 1% calcium oxide; up to 1% plasticizer; up to 2.5% metal salt; and balance of incidental impurities. The composition for use in concrete may generally comprise, based on total dry weight percent of the composition, 60 to 99% calcium carbonate and magnesium carbonate; 10% pozzolan; greater than zero and less than 1% calcium oxide; up to 1% plasticizer; up to 2.5% metal salt; and balance of incidental impurities.

The composition may comprise, based on weight percent of the composition, from 50-99%, 50-80%, 50-75%, 50-60%, 55-75%, 60-99%, 60-80%, 60-75%, 75-99%, 75-80%, 80-99%, 80-90%, at least 90%, at least 95% calcium carbonate and magnesium carbonate. The GCC may comprise calcium carbonate obtained from natural sources, such as limestone, marble, calcite or chalk, and processed through a wet and/or dry treatment such as grinding, screening and/or fractionating, for example by a cyclone or classifier. The GCC may have a particle size from up to 500 micrometers, such as up to 420 micrometers, 1-500 micrometers, 1-420 micrometers, 10-400 micrometers, 10-200 micrometers, 200-400 micrometers, and 250-500 micrometers. The calcium carbonate and magnesium carbonate may be substantially free, essentially free, and completely free of magnesium carbonate. The phrase "substantially free" as used herein refers to the compositions having 8 wt. % or less, "essentially free" means less than 5 wt. % and "completely free" means less than 1 wt. %. The composition may lack magnesium carbonate other than as incidental impurities.

The composition may comprise, based on weight percent of the composition, from 1-20%, 1-10%, 2-38%, 5-10%, 8-34%, 10-30%, 10-20%, 15-25%, 20-40%, 25-40%, 25-35%, 25-30%, 30-40%, 30-35%, and 35-40% pozzolan. The pozzolan may comprise natural or man-made materials and may include metakaolin, ash (including but not limited to fly ash, volcanic ash, and husk ash), silica fume, pumice, volcanic glass and diatomaceous earths, ground granulated blast furnace slag.

The composition may comprise, based on weight percent of the composition, from greater than 0 and up to 3%, 0.1-3%, 0.5-3%, 1-3%, 1-2%, up to 2%, greater than 0 and up to 2%, 0.1-2%, 0.5-2%, 1-2%, up to 1%, greater than 0 and up to 1%, 0.1-1%, 0.5-1%, and 2-3% calcium oxide. The calcium oxide may comprise quicklime and/or hydrated lime. Calcium oxide, which may be referred to as lime or quicklime in general terms, may comprise calcium oxide containing magnesium and inorganic materials, in which carbonates, oxides and hydroxides predominate. Hydrated lime may comprise calcium hydroxide including magnesium and inorganic materials, in which carbonates, oxides and hydroxides may predominate. The range of calcium plus magnesium, converted to their oxide equivalents, may be at least 80%.

The composition may comprise, based on weight percent of the composition, from greater than 0 and up to 2%, 0.1-2%, 0.5-2%, 1-2%, up to 1%, greater than 0 and up to 1%, 0.1-1%, and 0.5-1% plasticizer. The plasticizer may comprise a plasticizer, superplasticizer, and/or liquid reducer including at least one of lignosulfonates, sulfonated naphthalene condensate or sulfonated melamine formaldehyde, or polycarboxylic ethers.

The composition may comprise, based on weight percent of the composition, from greater than 0 and up to 5%, 1-5%, 1-4%, 1-3%, 1-2%, 2-5%, 2-4%, 2-3%, 3-5%, 3-4%, greater than 0 and up to 4%, greater than 0 and up to 3%, greater than 0 and up to 2%, and greater than 0 and up to 1% metal salt. The metal salt may comprise an alkali metal, an alkali earth metal, and combinations thereof (e.g., Li, Na, K, Rb, Cs, Fr, Be, Mg, Ca, Sr, Ba, Ra; these and other metals generally present in the particulate metal salt and/or mineral composition in an ionic (cationic) or oxidized state (positive oxidation level)). The metal may comprise sodium, potassium, magnesium, calcium, and/or aluminum. The metal salt may comprise an anion including carbonate, bicarbonate, nitrate, hydroxide, chloride, fluoride, sulfate, bisulfate, formate, aluminate, silicate, and combinations thereof (e.g., suitably carbonate or bicarbonate; alternatively free from halogens such as chlorine and/or fluorine). Examples of specific metal salts may include sodium bicarbonate, sodium silicate, calcium carbonate, calcium chloride, calcium formate, calcium hydroxide, metakaolin, sodium carbonate, sodium aluminate, and combinations thereof. The metal salt may comprise sodium silicate.

A cementitious mixture may generally comprise, based on total volume of the mixture: 0.5 to 10% of a composition for use in concrete as generally described herein; 2 to 30% cement; 50 to 85% aggregate; 10 to 25% water; and optionally 4 to 8% air. A cementitious mixture may generally comprise, based on total volume of the mixture: 0.6 to 6% of the composition for use in concrete as generally described herein; 5 to 20% cement; 60 to 75% aggregate; 10 to 20% water; and optionally 4 to 8% air. The cementitious mixture may generally comprise, based on total volume of the mixture: 2 to 8% of a composition for use in concrete as generally described herein; 8 to 24% cement; 55 to 80% aggregate; 12 to 24% water; and optionally 4 to 8% air. The cementitious mixture may generally comprise, based on total volume of the mixture: 4 to 6% of a composition for use in concrete as generally described herein; 12 to 20% cement; 60 to 75% aggregate; 15 to 20% water; and optionally 4 to 8% air. As discussed above, the composition for use in concrete may generally comprise, based on total dry weight percent of the composition: at least 50% calcium carbonate and magnesium carbonate; 1-40% pozzolan; up to 3% calcium oxide; up to 2% plasticizer; up to 5% sodium silicate; and balance of incidental impurities.

The aggregate may comprise, based on total volume of the mixture, 27.5 to 50% coarse aggregate and 22.5 to 40% fine aggregate. The coarse aggregate may comprise, based on total volume of the mixture, 27.5-44%, 27.5-33%, 33-50%, 33-44%, 39-41%, and 44-50%. The fine aggregate may comprise, based on total volume of the mixture, 27-35%, 22.5-32%, and 32-40%. The coarse aggregate may be characterized by a particle size of at least 4.75 mm, and the fine aggregate may be characterized by a particle size of less than 4.75 mm. The coarse aggregate may be characterized by a particle size of at least 4.75 mm, such as 4.75-60 mm, 4.75-50.8 mm, 4.75-20 mm, 10-60 mm, 20-50 mm, and 25-35 mm. The fine aggregate may be characterized by a particle size from greater than zero up to less than 4.75 mm, such as less than 4 mm and 0.5 to less than 4.75 mm. The coarse aggregate may comprise gravel or crushed stone. The fine aggregate may comprise sand.

Example

The present invention may be better understood when read in conjunction with the following representative example. The following example is included for purposes of illustration and not limitation.

As shown in Table 1, the cementitious mixture comprises, based on 27 cubic feet or 1 cubic yard of the mixture, 0.699 ft$^3$ of the composition for use in concrete, 2.442 ft$^3$ Portland cement, 9.846 ft$^3$ coarse aggregate, 8.413 ft$^3$ fine aggregate, 4.006 ft$^3$ water, and 1.62 ft$^3$ air. In other words, the cementitious mixture comprises, based a total volume of the mixture, 2.6% of the composition for use in concrete, 9% Portland cement, 36.5% coarse aggregate, 31.1% fine aggregate, 14.8% water, and 6% air. The cementitious mixture comprises, based on weight percent of the mixture, 42.9% of the composition for use in concrete, 35.2% Portland cement, 12.4% coarse aggregate, 3.1% fine aggregate, and 6.4% water. The specific gravity and absorption of the coarse aggregate is tested by ASTM C127-15, the specific gravity and absorption of fine aggregate is tested by ASTM C128-15, and the density and specific gravity of the hydraulic cement tested is by ASTM C188-17.

As shown in Table 2, the cementitious mixture is characterized by a compressive strength of 5600 psi after 7 days to cure and 6850 psi after 28 days to cure, and a rapid chloride permeability of 3500. The control comprising 100% cement is characterized by a compressive strength of 5500 psi after 7 days to cure and 6500 psi after 28 days to cure, and a rapid chloride permeability of 4200. The cementitious mixture is characterized by improve compressive strength and rapid chloride permeability when compared to the control. Without wishing to be bound to any particular theory, it is believed that up to 30% of the cement in the cementitious mixture may be replaced by the composition for use in concrete to maintain up to 75% of the physical characteristics (e.g., compressive strength, rapid chloride permeability, workability (slump), and curing) when compared to a cementitious mixture lacking the composition for use in concrete.

tion: 60 to 99% calcium carbonate and magnesium carbonate; 1-20% pozzolan; up to 1% calcium oxide; up to 1% plasticizer; up to 2.5% sodium silicate; and balance of incidental impurities.

Aspect 3. The composition according to aspects 1 or 2 consisting of, based on total dry weight percent of the composition: 60 to 99% calcium carbonate and magnesium carbonate; 8-12% pozzolan; greater than zero and less than 1% calcium oxide; up to 1% plasticizer; up to 2.5% sodium silicate; and balance of incidental impurities.

Aspect 4. A cementitious mixture comprising, based on total volume of the mixture: 0.5 to 10% of the composition according to any of aspects 1 to 3; 2 to 30% cement; 50 to 85% aggregate; 10 to 25% water; and optionally 4 to 8% air.

Aspects 5. The cementitious mixture according to aspect 4 comprising, based on total volume of the mixture: 0.6 to 6% of the composition according to any of aspects 1 to 3; 5 to 20% cement; 60 to 75% aggregate; 10 to 20% water; and optionally 4 to 8% air.

Aspect 6. The cementitious mixture according to any of aspects 4 or 5 comprising, based on total volume of the mixture: 2 to 4% of the composition according to any of aspects 1 to 3; 9 to 16% cement; 65 to 70% aggregate; 17 to 16% water; and 5 to 7% air.

Aspect 7. The cementitious mixture according to any of aspects 4 to 6, wherein the aggregate comprises, based on total volume of the mixture: 27.5 to 50% coarse aggregate; and 22.5 to 40% fine aggregate;

TABLE 1

Concrete Mix Design

| Material Type | 1 YD (lbs.) | Specific Gravity (Gs) | Volume | Absorption % | Trial Batch (lbs.) (Saturated Surface Dry) | Free Water (lbs.) | Agg Water Content % | Trial Batch (lbs.) Moisture Adjusted |
|---|---|---|---|---|---|---|---|---|
| Course Agg (greater than 4.75 mm) | 1665 | 2.17 | 9.846 | 0.63 | 61.7 | −0.4 | 1.23 | 62.0 |
| Fine Agg (finer than 4.75 mm) | 1365 | 2.6 | 8.413 | 1.37 | 50.6 | −1.3 | 3.9 | 51.8 |
| Portland Cement (ASTM C150-Type 1) | 480 | 3.15 | 2.442 | | 17.8 | | | 17.8 |
| Carmeuse Composition | 120 | 2.75 | 0.699 | | 4.4 | 0.0 | 0 | 4.4 |
| Air | | 6% | 1.62 | | | | | |
| Water | 250 | 1 | 4.006 | | 9.3 | 7.6 | | 7.6 |

TABLE 2

Hardended Concrete Properties

| | Compressive Strength (psi) (ASTM C39 AASHTO T22) | | Rapid Chloride Permeability (ASTM C1202/ AASHTO T277) |
|---|---|---|---|
| | 7 Day | 28 Day | 28 Day |
| 100% Cement | 5500 | 6500 | 4200 |
| Enhance Milled Limestone Composition | 5600 | 6850 | 3500 |

The following aspects are disclosed in the present invention:

Aspect 1. A composition for use in concrete comprising, based on total dry weight percent of the composition: at least 50% calcium carbonate and magnesium carbonate; 1-40% pozzolan; up to 3% calcium oxide; up to 2% plasticizer; up to 5% metal salt; and balance of incidental impurities.

Aspect 2. The composition according to aspect 1 comprising, based on total dry weight percent of the composi- Aspect 8. The cementitious mixture according to any of aspects 4 to 7 consisting of, based on total volume of the mixture: 2 to 4% of the composition according to any of aspects 1 to 3; 7 to 9% cement; 35.5 to 42% coarse aggregate; and 27.5 to 35% fine aggregate; 12 to 16% water; and 5 to 7% air.]

Aspect 9. The cementitious mixture according to any of aspects 7 or 8, wherein the coarse aggregate is characterized by a particle size of at least 4.75 mm, and the fine aggregate is characterized by a particle size of less than 4.75 mm.

Aspect 10. The cementitious mixture according to any of aspects 7 to 9 comprising more coarse aggregate than fine aggregate.

Aspect 11. A concrete product comprising the cementitious mixture according to any of aspects 4 to 10 or a reaction product thereof.

Aspect 12. A method of making a composition for use in concrete, the method comprising: mixing, based on total dry weight percent of the composition, at least 50% calcium carbonate and magnesium carbonate, 1-40% pozzolan, up to 3% calcium oxide, up to 2% plasticizer, up to 5% metal salt, and balance of incidental impurities to form the composition.

Aspect 13. A method of making a cementitious mixture, the method comprising: mixing, based on total volume of the mixture: 0.5 to 10% of a composition for use in concrete, the composition comprising, based on total dry weight percent of the composition at least 50% calcium carbonate and magnesium carbonate, 1-40% pozzolan, up to 3% calcium oxide, up to 2% plasticizer, up to 5% metal salt, and balance of incidental impurities to form the composition; 2 to 30% cement; 50 to 85% aggregate; 10 to 25% water; and optionally 4 to 8% air.

Aspect 14. A method of forming a concrete, the method comprising: mixing the cementitious mixture according to any of aspects 4 to 10; and curing the cementitious mixture to form the concrete.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A cementitious mixture comprising, based on total volume of the mixture:
   0.5 to 10% of a composition for use in concrete comprising, based on total dry weight percent of the composition
      at least 50% calcium carbonate and magnesium carbonate,
      1-40% pozzolan,
      up to 3% calcium oxide; up to 2% plasticizer,
      up to 5% metal salt, and
      balance of incidental impurities;
   2 to 30% cement;
   50 to 85% aggregate;
   10 to 25% water; and
   optionally 4 to 8% air.

2. The cementitious mixture of claim 1 comprising, based on total volume of the mixture:
   0.6 to 6% of the composition for use in concrete;
   5 to 20% cement;
   60 to 75% aggregate;
   10 to 20% water; and
   optionally 4 to 8% air.

3. The cementitious mixture of claim 1 comprising, based on total volume of the mixture:
   2 to 4% of the composition for use in concrete;
   9 to 16% cement;
   65 to 70% aggregate;
   17 to 16% water; and
   5 to 7% air.

4. The cementitious mixture of claim 1, wherein the aggregate comprises, based on total volume of the mixture:
   27.5 to 50% coarse aggregate; and
   22.5 to 40% fine aggregate.

5. The cementitious mixture of claim 4 consisting of, based on total volume of the mixture:
   2 to 4% of the composition for use in concrete;
   7 to 9% cement;
   35.5 to 42% coarse aggregate;
   27.5 to 35% fine aggregate;
   12 to 16% water; and
   5 to 7% air.

6. The cementitious mixture of claim 4, wherein the coarse aggregate is characterized by a particle size of at least 4.75 mm, and the fine aggregate is characterized by a particle size of less than 4.75 mm.

7. The cementitious mixture of claim 4 comprising more coarse aggregate than fine aggregate.

8. The composition of claim 1, wherein the pozzolan includes at least one of fly ash, volcanic ash, husk ash, silica fume, pumice, volcanic glass and diatomaceous earths, and ground granulated blast furnace slag.

9. The composition of claim 1 completely free of magnesium carbonate.

10. The composition of claim 1, wherein the calcium carbonate is characterized by a particle size up to 500 micrometers.

11. The cementitious mixture of claim 6, wherein the coarse aggregate comprises at least one of gravel and stone, and the fine aggregate comprises sand.

12. The cementitious mixture of claim 6 characterized by
   a compressive strength greater than 5500 psi after 7 days to cure,
   a compressive strength greater than 6500 psi after 28 days to cure, and
   a rapid chloride permeability less than 4200.

13. A concrete product comprising the cementitious mixture of claim 2 or a reaction product thereof.

14. A method of making a cementitious mixture, the method comprising mixing, based on total volume of the mixture:
   0.5 to 10% of a composition for use in concrete, the composition comprising, based on total dry weight percent of the composition, at least 50% calcium carbonate and magnesium carbonate, 1-40% pozzolan, up to 3% calcium oxide, up to 2% plasticizer, up to 5% metal salt, and balance of incidental impurities to form the composition;
   2 to 30% cement;
   50 to 85% aggregate;
   10 to 25% water; and
   optionally 4 to 8% air.

15. A method of forming a concrete, the method comprising:
   mixing the cementitious mixture of claim 14; and
   curing the cementitious mixture to form the concrete.

* * * * *

UNITED STATES PATENT AND TRADEMARK OFFICE
CERTIFICATE OF CORRECTION

PATENT NO. : 11,401,216 B2
APPLICATION NO. : 16/632603
DATED : August 2, 2022
INVENTOR(S) : Lance Olson and Dale C Andrews It is certified that error appears in the above-identified patent and that said Letters Patent is hereby corrected as shown below:

On the Title Page

Item (71), Delete:
"Carmeuse North America"

And insert:
--Carmeuse Lime, Inc.--

Signed and Sealed this
Fifteenth Day of November, 2022

Katherine Kelly Vidal
*Director of the United States Patent and Trademark Office*